(12) United States Patent
Poeckl

(10) Patent No.: US 7,073,990 B2
(45) Date of Patent: Jul. 11, 2006

(54) DOWEL GAUGE

(76) Inventor: Ursula Poeckl, A-5322, Hof, 85 (AT)

( * ) Notice: Subject to any disclaimer, the term of this patent is extended or adjusted under 35 U.S.C. 154(b) by 247 days.

(21) Appl. No.: 10/682,382

(22) Filed: Oct. 9, 2003

(65) Prior Publication Data

US 2005/0079021 A1    Apr. 14, 2005

(51) Int. Cl.
B23B 47/28    (2006.01)

(52) U.S. Cl. .............................. 408/115 R; 408/241 B

(58) Field of Classification Search .............. 408/72 B, 408/97, 103, 115 R, 115 B, 241 B
See application file for complete search history.

(56) References Cited

U.S. PATENT DOCUMENTS

| | | | | |
|---|---|---|---|---|
| 706,392 | A | * | 8/1902 | Corliss ........................ 408/103 |
| 1,097,153 | A | * | 5/1914 | Wolgamood ............ 408/115 R |
| 1,153,841 | A | * | 9/1915 | Earle ...................... 408/115 R |
| 2,804,788 | A | * | 9/1957 | Humphrey ................. 408/103 |
| 2,838,966 | A | * | 6/1958 | Robertson ............. 408/115 R |
| 3,008,359 | A | * | 11/1961 | Mackey .................. 408/115 R |
| 3,363,488 | A | * | 1/1968 | Thau et al. ................... 408/97 |
| 4,176,989 | A | * | 12/1979 | Wolff ..................... 408/115 R |
| 4,594,032 | A | * | 6/1986 | Warburg .................. 408/115 R |
| 4,893,970 | A | | 1/1990 | Becraft |
| 5,154,548 | A | | 10/1992 | Walsh |
| 5,407,306 | A | | 4/1995 | Klapperich |
| 5,586,846 | A | | 12/1996 | Johns |
| 6,220,796 | B1 | * | 4/2001 | Chiang ................... 408/115 R |

FOREIGN PATENT DOCUMENTS

| | | | |
|---|---|---|---|
| DE | 3518496 | * | 11/1986 |
| DE | 29913635 | * | 12/1999 |
| EP | 1277534 | * | 1/2003 |
| GB | 2092488 | * | 8/1982 |

OTHER PUBLICATIONS

Search Report dated Oct. 7, 2002 in European Application No. 02 01 4179 (1 page).

* cited by examiner

Primary Examiner—Daniel W. Howell
(74) Attorney, Agent, or Firm—Flynn, Thiel, Boutell & Tanis, P.C.

(57) ABSTRACT

A dowel gauge (1) comprises an angle section (2) with a first leg (3) and a second perpendicular leg (4) that are each provided with a bore (5, 6) to which a drill guide (9) is detachably fastenable from outside. Scales (12, 13, 14) are provided on the ends of the two legs (3, 4) and one long side of the first leg (3), respectively.

18 Claims, 5 Drawing Sheets

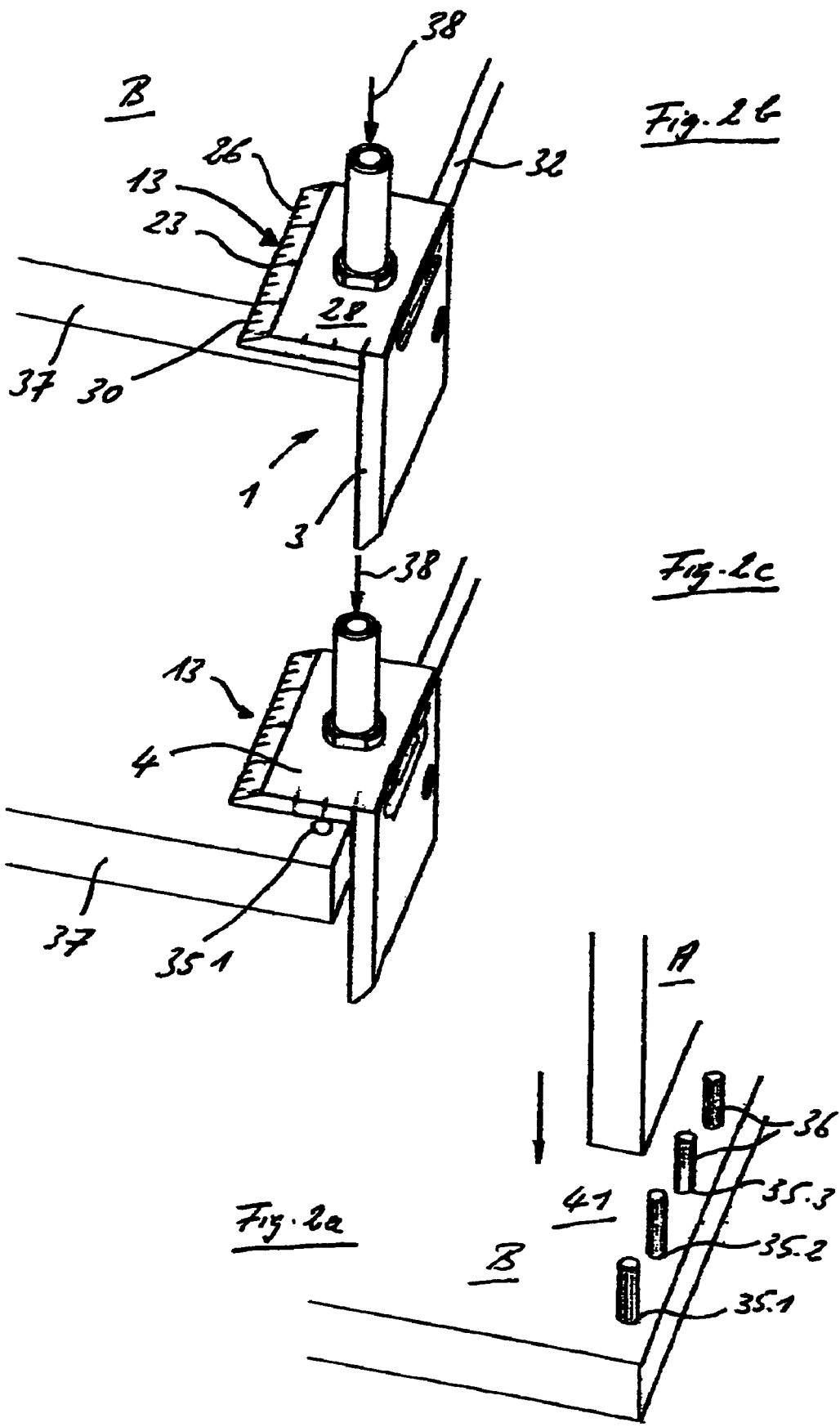

Figure 1B:
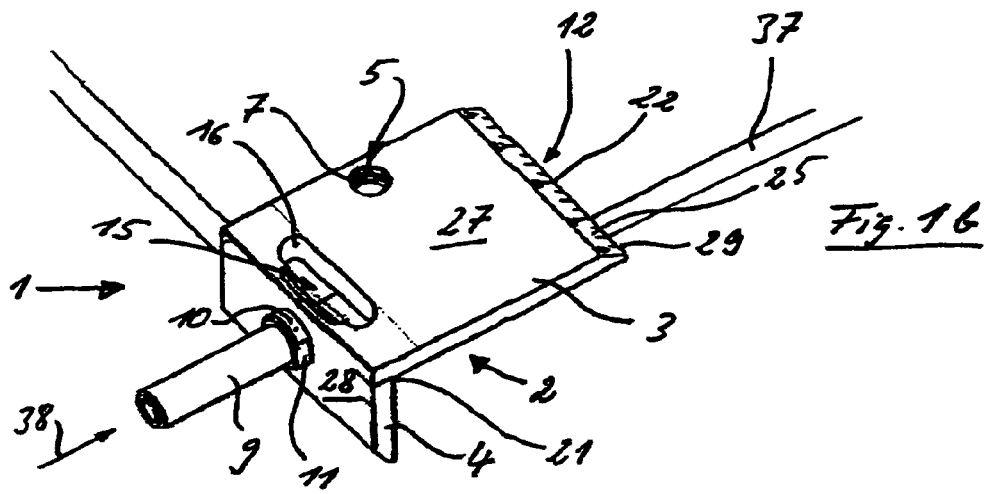

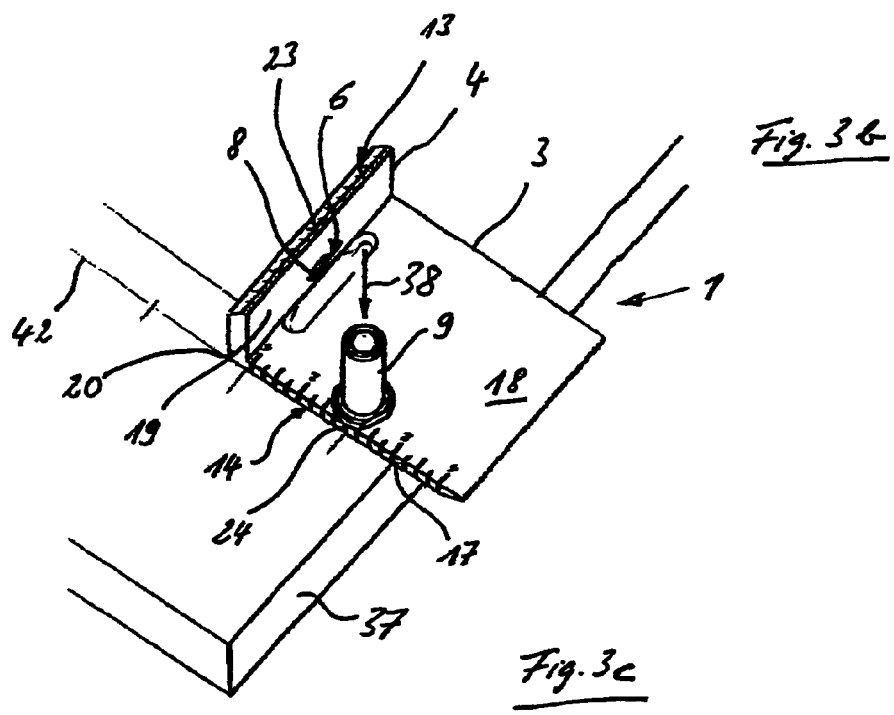
Fig. 3b
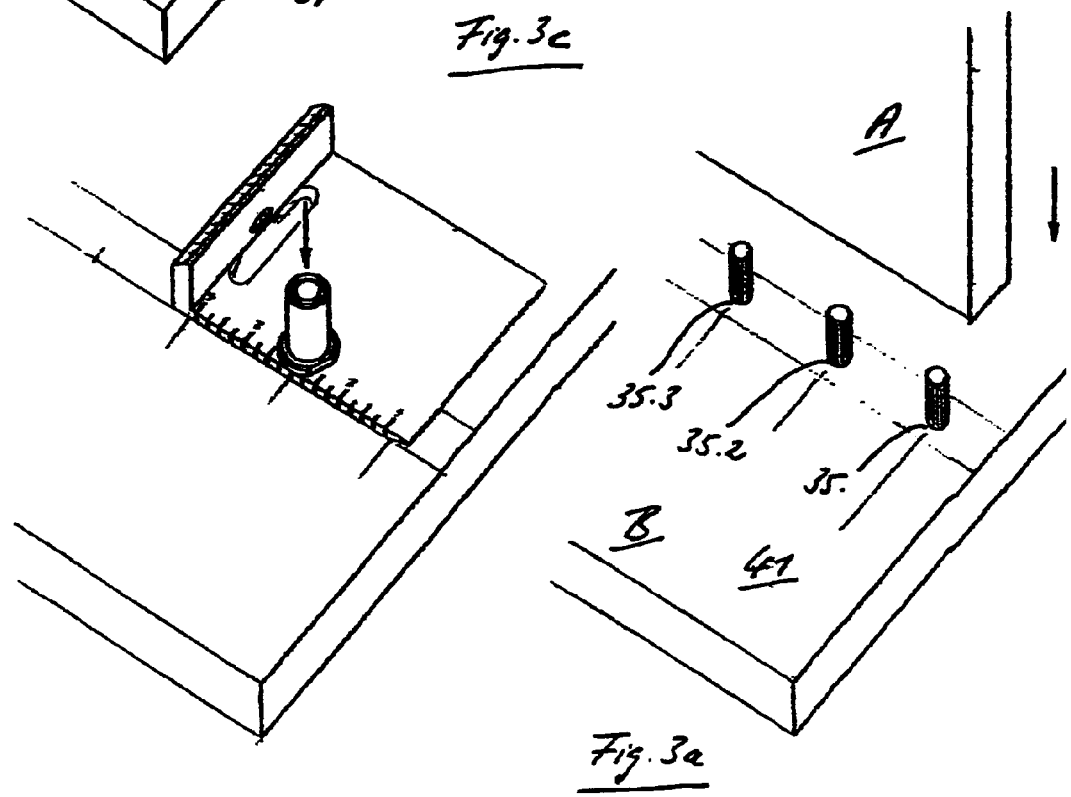
Fig. 3c
Fig. 3a

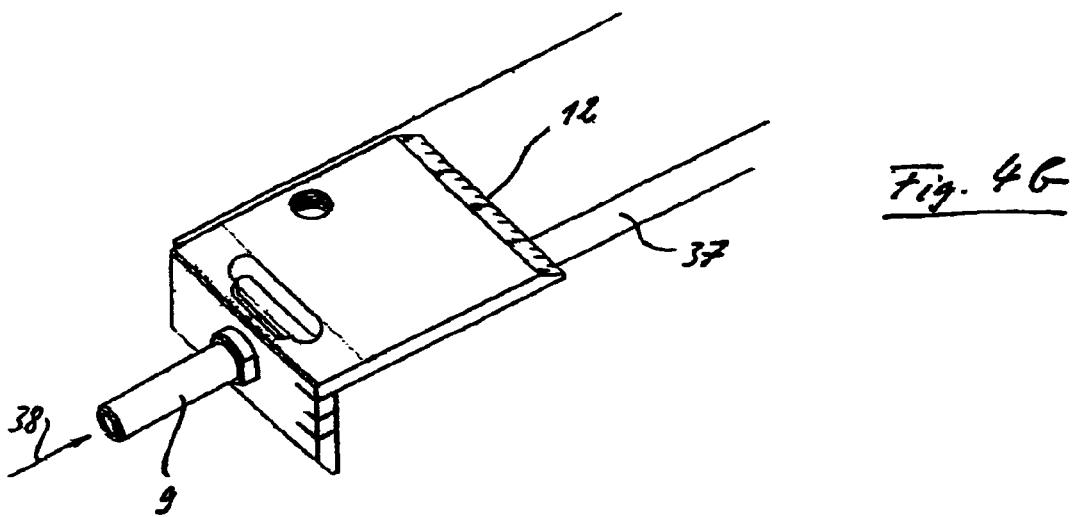
Fig. 4G
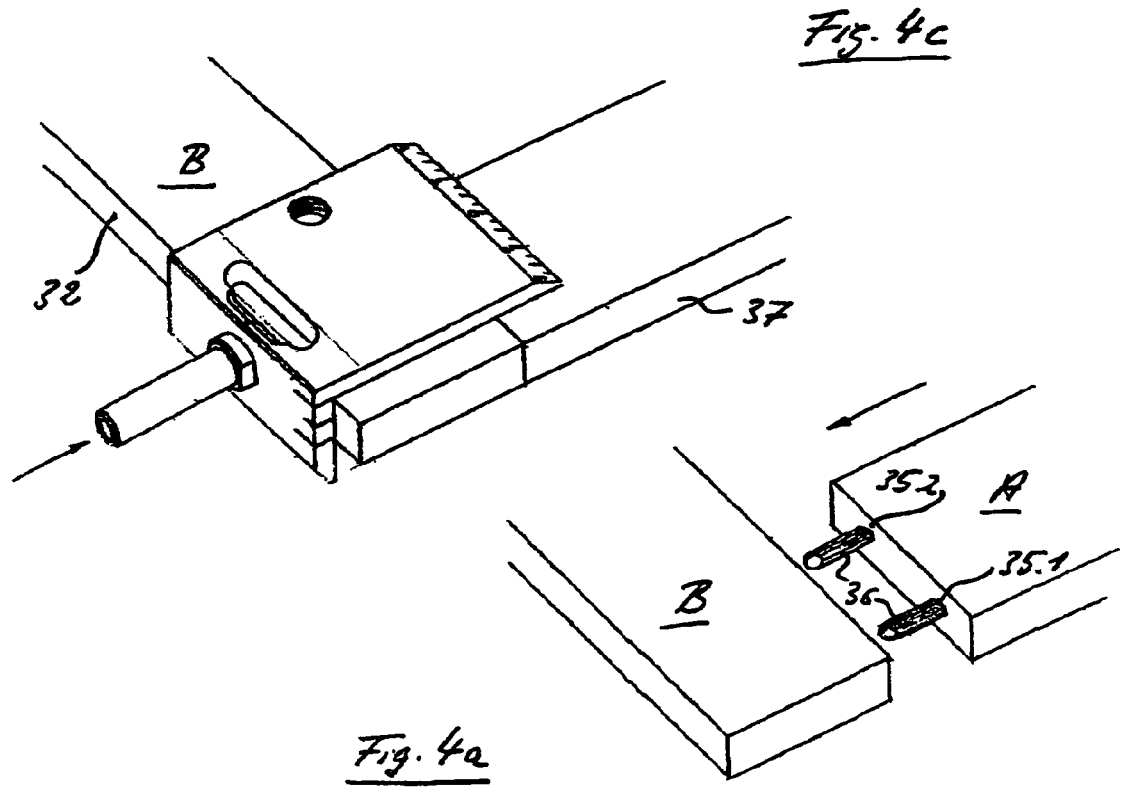
Fig. 4c
Fig. 4a

DOWEL GAUGE

This invention relates to a dowel gauge, i.e. a device for determining the position of and guiding the drill when drilling bores into workpieces that are in particular rectangular in cross section, for example plate-shaped, in particular wood workpieces, into which dowels are inserted to join workpieces together.

The position of dowel bores or holes is usually scratched on the workpiece with a scratch gauge before they are drilled by hand or with a hand drill into the workpieces, for example boards, to be joined by dowels.

To join boards flush, it is also known to insert bolts into the dowel bores with a marking point after the dowel bores are drilled into one board, then dispose the second board flush and press the marking points into the second board to mark the places where the dowel bores are drilled into the second workpiece.

A trowel-like device with a plurality of drill guides is known for drilling dowel bores into boards. To form a corner joint, a dowel is mounted on a board face and the trowel slipped on the dowel, whereupon an angle stop is pushed against the board from the grip side and fixed in order to drill the further dowel bores. The handling of this device is extremely complicated. Also, it cannot produce exactly flush connections.

The problem of the invention is to provide a dowel gauge that is easy to handle and yields exactly flush connections having a simple structure.

This is obtained according to the invention by the dowel gauge stated in claim 1. The subclaims render advantageous embodiments of the inventive dowel gauge.

The inventive dowel gauge permits the position of the drill to be determined very simply and precisely when drilling boreholes for dowels. The dowel holes can thus be drilled into the workpieces fast and precisely.

The inventive dowel gauge is intended primarily for wood workpieces, but it can also be used for workpieces of other materials that are of rectangular cross section, i.e. have at least one right-angled edge against which the two legs of the angle section of the dowel gauge can be placed. The wood workpieces can be e.g. boards, beams or ledges.

The inventive dowel gauge makes it possible to drill dowel bores with a hand drill having a wood dowel drill clamped therein. The drill guide permits exact dowel holes to be drilled by hand or with a hand drill having a wood dowel drill, the holes extending horizontally and vertically straight and at an angle of 90° to the wood surface.

The inventive dowel gauge comprises two parts. One part is a rectangular angle section formed of two plate-shaped legs. When dowel bores are drilled on the face or edge of the surface of a board or similar plate-shaped workpiece, both legs are brought to rest against the board or plate-shaped workpiece, i.e. the edge between the face and the surface of the rectangular workpiece is enclosed by the two legs.

The angle section is preferably made of metal, in particular aluminum material. The angle section has a bore in each of the plate-shaped legs, further at least three scales, namely one on the free end of each of the two legs, i.e. scales extending transversely, i.e. across the width of the plate-shaped legs, and a third scale extending on a long side of one of the two legs, i.e. in the longitudinal direction thereof. The scales are preferably formed by line rules, whereby the lines can at least partly have numbers.

The other part is the drill guide, which is preferably formed by a sleeve that is adapted to be detachably connected alternatively with one of the two bores in the two legs of the angle section, for example by the externally threaded sleeve being screwed into an internal thread in or on the bore.

The drill guide or sleeve can at the same time form a stop for a depth stop ring which is fastened to the drill. The drill guide or sleeve is preferably made of hardened steel.

The second leg of the angle section (i.e. the one without a scale on the long side) is preferably shorter than the first leg with the scale on the long side, since the second leg is usually brought to rest against the face of the plate-shaped workpiece and can thus be formed shorter.

The bore in the first leg is preferably spaced from the longitudinal edge thereof with the scale at a distance corresponding to the distance between the corner of the angle section and the bore in the second leg. This measure is necessary if dowel holes are to be drilled on the surface of a workpiece to join the workpiece with a second workpiece in a T shape.

The bore in the first leg (with the scale on the long side) is disposed preferably in the middle between the angle section edge and the end of the first leg in the longitudinal direction. Further, the bore in the second leg (without a scale on the long side) is preferably disposed in the middle in the transverse direction. Also, the scales on the free ends of the two legs preferably have in the middle a zero point from which the line rule extends symmetrically on each side as on a geometric triangle.

The free end of each leg is provided on the outside surface thereof with a material removal tapering to an edge. The material removal can be formed for example by a bevel. Thus, the scales can be realized on the free ends of the two legs up to the workpiece. Since one sees the face between the outside and inside surfaces of the first leg when drilling with the drill guide in the bore on the long side of the first leg, the scale on the long side is provided on the face between the outside and inside surfaces of the first leg, whereby the lines of said scale can extend preferably completely or almost as far as the inside surface of the first leg.

Preferably, the first leg has provided therein an opening extending in the transverse direction and bearing preferably on its edge a zero point that is flush with the bore in the second leg. Thus, dowel holes can be drilled for example on the miter, e.g. in the case of a frame. From the zero point a scale can extend along said opening in the transverse direction of the first leg, preferably in both directions. Said opening is preferably disposed on the end of the first leg facing the second leg.

In the following the inventive dowel gauge will be explained in more detail by way of example with reference to the drawing, in which:

FIGS. 1a, 2a, 3a, 4a and 5a show the connection to be produced between two boards A and B; and FIGS. 1b and 1c, 2b and 2c, 3b and 3c, 4b and 4c, 5b and 5c show the particular arrangement of the dowel gauge on board A or B for drilling dowel bores for the connections according to FIGS. 1a, 2a, 3a, 4a, 5a Dowel gauge 1 comprises according to FIG. 1b rectangular angle section 2 with first plate-shaped leg 3 and second perpendicular plate-shaped leg 4. Each leg 3, 4 is provided with bore 5, 6, whereby bore 6 can be seen e.g. in FIG. 3b. Bores 5, 6 have internal threads 7, 8. Externally threaded sleeve-shaped drill guide 9 is adapted to be screwed alternatively into one or the other bore 5, 6.

Sleeve-shaped drill guide 9 is provided with annular stop 10 provided with opposite tangential surfaces 11 for a wrench.

As apparent for example from FIGS. 1b and 3b, the angle section has four scales. First scale 12 is provided on the free end of first leg 3, second scale 13 on the free end of second leg 4, third scale 14 on one long side of first leg 3, and fourth scale 15 in opening 16 in first leg 3.

First leg 3 is formed longer than second leg 4.

Bore 5 in first leg 3 is spaced from longitudinal edge 17 thereof with third scale 14 at distance b corresponding to distance a between corner 21 between inside surface 18 of the first leg and inside surface 19 of the second leg and bore 6 in second leg 4. Bore 5 in first leg 3 is disposed in the middle between angle section edge 20 and the end of first leg 3 with first scale 12 in the longitudinal direction of first leg 3. Likewise, bore 6 in the second leg is disposed in the middle of second leg 4 in the transverse direction.

Scales 12, 13 on the ends of first leg 3 and second leg 4 have zero points 22, 23 in the middle in the transverse direction of leg 3, 4. Scales 12 to 15 are formed by line rules with lines at quarter-centimeter intervals, the centimeter lines being provided with numbers.

Scale 14 on longitudinal edge 17 of first leg 3 has its zero point 24 in the middle between angle section edge 20 and the end of first leg 3 with scale 12.

The ends of first and second legs 3, 4 of angle section 2 are tapered to edges 29, 30 by bevels 25, 26 e.g. by material removal on outside surface 27, 28. From edge 29, 30 the lines of scales 12, 13 extend into bevel 25, 26. However, scale 14 is provided on the long side of first leg 3 on the face between outside surface 27 and inside surface 18 of first leg 3, the lines of scale 14 extending from inside surface 18 to outside surface 27.

Opening 16 in first leg 3 has, on one longitudinal edge of said opening, zero point 33 of scale 15 extending in the transverse direction, zero point 33 being flush with the middle of bore 6 in second leg 4. Opening 16 is disposed in the end of first leg 3 facing second leg 4. Instead of a scale, only zero point 33 can also be provided on opening 16.

Figure 1C:
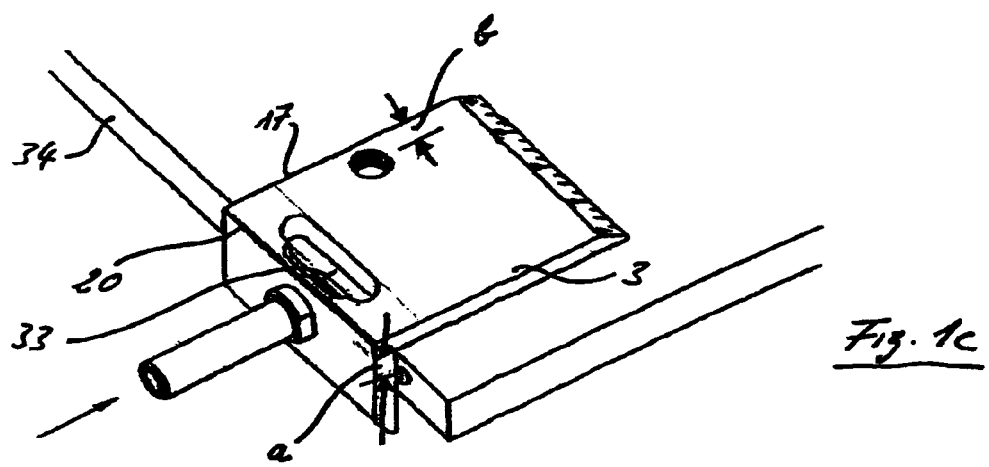
Figure 1A:
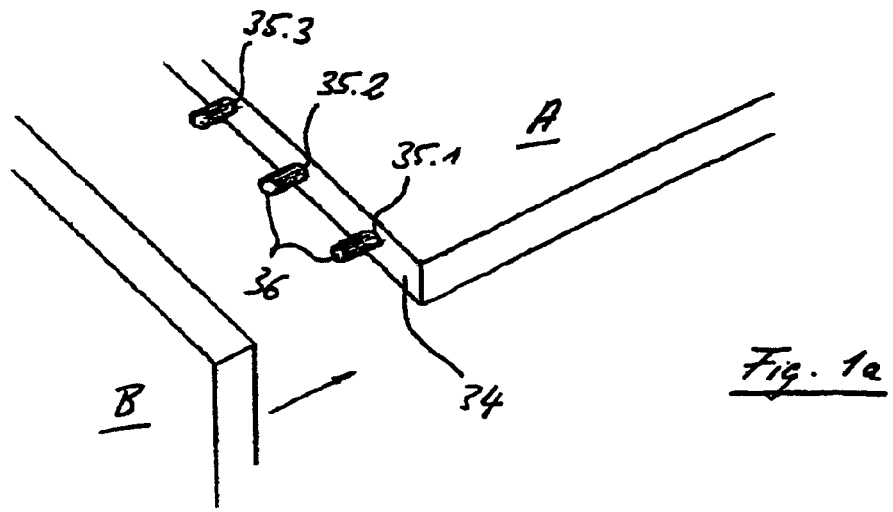

To produce the corner joint between the boards or similar parts A and B according to FIG. 1a, boreholes 35.1, 35.2, 35.3 are drilled into face 34 of part A, dowels 36 being inserted into said holes.

Further, dowel holes flush with boreholes 35.1, 35.2, 35.3 (not shown in FIG. 1a) are drilled on the edge of the surface of part B facing part A, as described in the following in connection with FIGS. 2a, 2b and 2c.

For drilling dowel holes 35.1, 35.2, 35.3 into part A, drill guide 9 is screwed into bore 6 in short leg 4 of dowel gauge 1 according to FIG. 1b. Then the desired distance of first borehole 35.1 in part A from lateral face 37 is measured with scale 12, whereupon first borehole 35.1 is drilled by introducing the drill (not shown) into drill guide 9 according to arrow 38. The depth of dowel hole 35.1 is determined here by a depth stop ring on the drill.

If there is a small distance between second borehole 35.2 and first borehole 35.1, short leg 4 is held laterally against first borehole 35.1 according to FIG. 1c. If the borehole distance is greater, the distance is traced with a meter rule and scale 12 held with zero point 22 against the traced scratch. Scale 12 is thus used for drilling boreholes 35.1, 35.2, 35.3 on face 34 of a board or similar plate-shaped part A.

Scale 13 is used for drilling on the edge of the surface of board or part B, as shown in FIGS. 2b and 2c. For this purpose, dowel gauge 1 is placed with long leg 3 against face 32 of board B. The distance of first borehole 35.1 from lateral face 37 is measured with scale 13, whereupon first borehole 35.1 is drilled by introducing the drill according to arrow 38.

If there is a small distance between second borehole 35.2 and first borehole 35.1, short leg 4 is placed laterally against first borehole 35.1 according to FIG. 2c. If the borehole distance is greater, the distance is traced with a meterstick and scale 13 held with zero point 23 according to the scratches.

According to FIG. 3a, boards or parts A and B are joined with dowels 36 in a T shape. For this purpose, boreholes 35.1, 35.2, 35.3 are drilled into surface 41 of part B, dowels 36 being inserted therein. Further, boreholes are drilled into the face of board A facing surface 41, as explained in more detail in connection with FIGS. 1a, 1b and 1c.

For drilling boreholes 35.1, 35.2, 35.3 into surface 41 of part B, drill guide 9 is screwed into bore 5 in long leg 3 according to FIGS. 3b and 3c. Scale 14 on longitudinal edge 17 of long leg 3 of dowel gauge 1 is used for drilling here.

Scratch 42 is drawn on surface 41. For drilling first borehole 35.1, longitudinal edge 17 is held against scratch 42 and the distance from lateral face 37 measured with scale 14, whereupon first borehole 35.1 is drilled by introducing the drill according to arrow 38. For drilling other boreholes 35.2, 35.3 the desired distance from borehole 35.1 is measured with scale 14.

To produce a corner joint between boards or similar plate-shaped parts A and B according to FIG. 4a e.g. for a flat frame, drill guide 9 is screwed into bore 6 according to FIG. 4b (as in FIGS. 1b and 1c) and scale 12 used for drilling boreholes 35.1, 35.2.

First borehole 35.1 in part A is then drilled into face 32 by holding scale 12 against one face 37 of board A according to FIG. 4b and second borehole 35.2 by holding scale 12 against the other side surface.

For drilling the boreholes (not shown) in face 32 of part B, part A is placed laterally flush against part B, as shown in FIG. 4c. Part A is thus used for reading the distance of the boreholes in part B from the two side surfaces of part A.

Figure 5B:
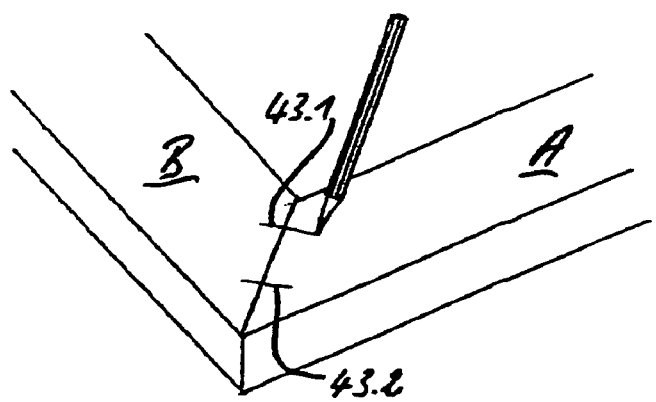
Figure 5C:
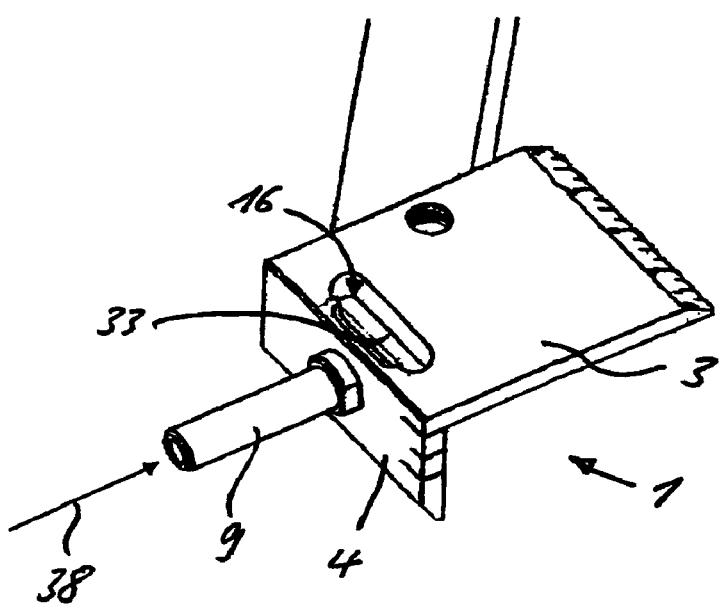
Figure 5A:
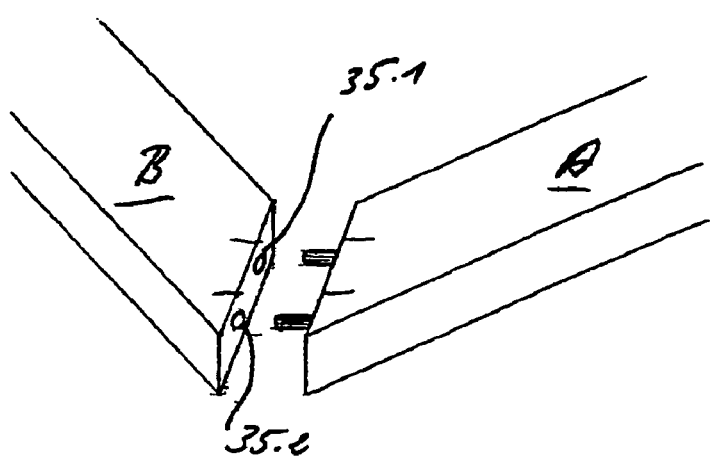

Scale 15 or zero point 33 in slot-shaped opening 16 in long leg 3 of dowel gauge 1 is used for drilling boreholes 35.1, 35.2 for corner joints, for example a corner joint with a miter according to FIG. 5a e.g. for a flat frame. Drill guide 9 is screwed into bore 6 in short leg 4 of dowel gauge 1 here.

Then parts A and B to be joined are placed together and the position of boreholes 35.1, 35.2 for dowels 36 is drawn on parts A and B with lines 43.1 and 43.2.

According to FIG. 5c, zero point 33 in the opening is first held on drawn line 43.1 and then on line 43.2 for drilling dowel holes 35.1, 35.2.

Instead of zero point 33, further line measuring units can be provided to the right and left of zero point 33 for drilling the two boreholes 35.1 and 35.2 e.g. instead of the two lines 43.1 and 43.2 starting out from a line in the middle.

The invention claimed is:

1. A dowel gauge comprising an angle section with a first leg and a second perpendicular leg that are each provided with at least one bore to which a drill guide is detachably fastenable from outside, the angle section having a corner disposed between the first leg and the second leg wherein the first leg has long sides and extends longitudinally away from the corner in a longitudinal direction, and the corner defines an angle section edge which extends in a transverse direction transverse to the longitudinal direction, an end scale being provided on the end of each of said first and second legs and a side scale being provided on at least one of the long sides of the first leg.

2. A dowel gauge according to claim 1, characterized in that the first leg is formed longer than the second leg.

3. A dowel gauge according to claim 1, characterized in that one of the long sides of the first leg defines a longitudinal edge, and the bore in the first leg is spaced from the longitudinal edge thereof at a distance corresponding to a distance between the corner of the angle section and the bore in the second leg.

4. A dowel gauge according to claim 3, characterized in that the side scale is provided on the longitudinal edge of the first leg on which the bore is disposed at the distance.

5. A dowel gauge according to claim 1, characterized in that the bore in the first leg is disposed in the middle of the first leg as defined between the angle section edge and the end of the first leg in the longitudinal direction.

6. A dowel gauge according to claim 1, characterized in that the bore in the second leg is disposed in the middle of the second leg as defined in the transverse direction.

7. A dowel gauge according to claim 1, characterized in that each of the end scales on the ends of the first and second legs have a zero point in the middle of the end scale as defined in the transverse direction.

8. A dowel gauge according to claim 1, characterized in that the side scale the long side of the first leg has a zero point in the middle thereof as defined between the angle section edge and the end of the first leg.

9. A dowel gauge according to claim 1, characterized in that the end of the first and/or second leg is tapered by material removal on an outside surface thereof to define an end edge which is provided with the end scale.

10. A dowel gauge according to claim 1, characterized in that the side scale on the long side of the first leg is provided on a side face of the first leg which is disposed between an inside surface of the first leg and an outside surface of the first leg.

11. A dowel gauge according to claim 10, characterized in that the side scale extends from the inside surface of the first leg to the outside surface of the first leg.

12. A dowel gauge according to claim 1, characterized in that the first leg has an opening with a zero point that is flush with the bore in the second leg.

13. A dowel gauge according to claim 12, characterized in that the zero point of the opening forms a zero point of a transverse scale extending in the transverse direction of the first leg.

14. A dowel gauge according to claim 12, characterized in that the opening is disposed on the side of the first leg facing the second leg.

15. A dowel gauge according to claim 1, characterized in that the drill guide is formed by a sleeve.

16. A dowel gauge according to claim 1, characterized in that the drill guide is provided for detachable fastening with an external thread to be screwed into an internal thread on the bore.

17. A dowel gauge according to claim 1, characterized in that the angle section is made of an aluminum material.

18. A dowel gauge according to claim 1, characterized in that the drill guide is made of steel.

* * * * *

UNITED STATES PATENT AND TRADEMARK OFFICE
CERTIFICATE OF CORRECTION

PATENT NO. : 7,073,990 B2 Page 1 of 1
APPLICATION NO. : 10/682382
DATED : July 11, 2006
INVENTOR(S) : Ursula Poeckl It is certified that error appears in the above-identified patent and that said Letters Patent is hereby corrected as shown below:

Column 5, line 24; change "in that the side scale the long side" to --in that the side scale on the long side--

Signed and Sealed this

Fifth Day of December, 2006

JON W. DUDAS
*Director of the United States Patent and Trademark Office*